June 28, 1949.　　　　B. B. JACOBSEN　　　　2,474,253
MEANS FOR MEASURING DIFFERENCE IN
FREQUENCY OF ALTERNATING CURRENTS
Filed Feb. 24, 1944　　　　　　　　　　　2 Sheets-Sheet 1
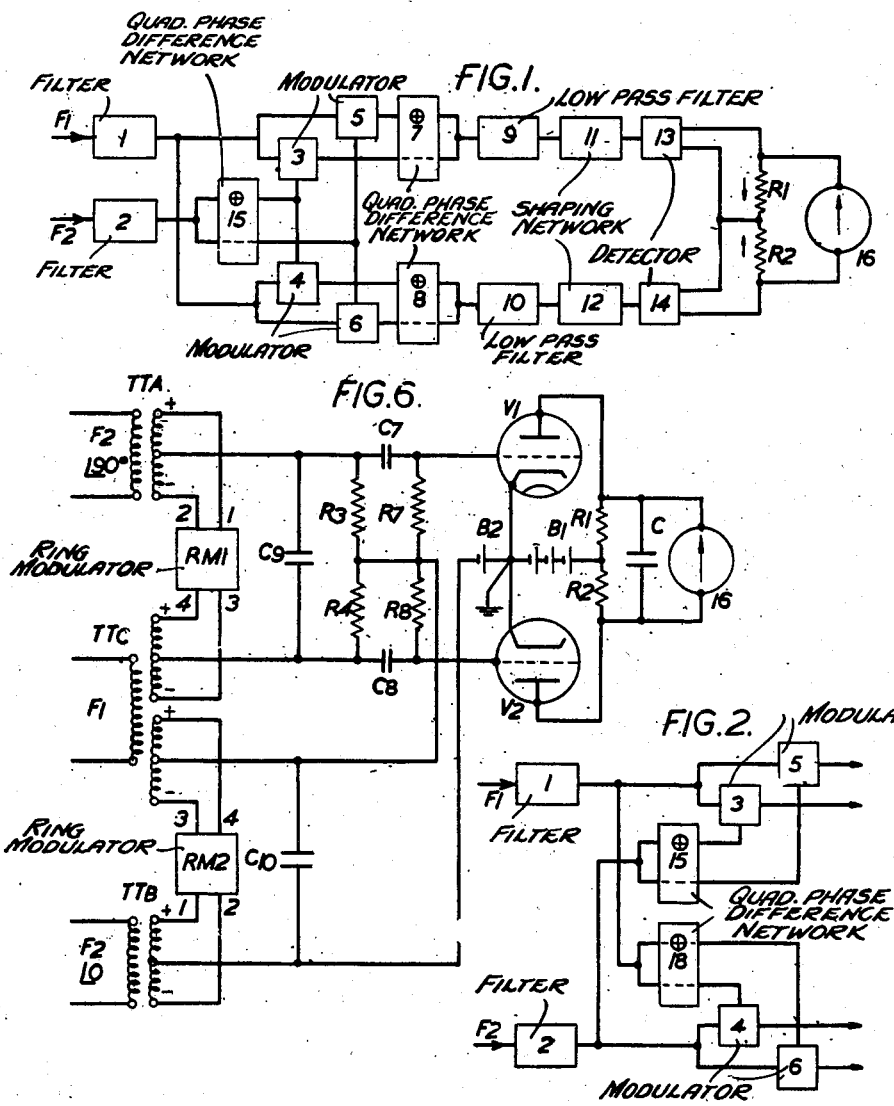
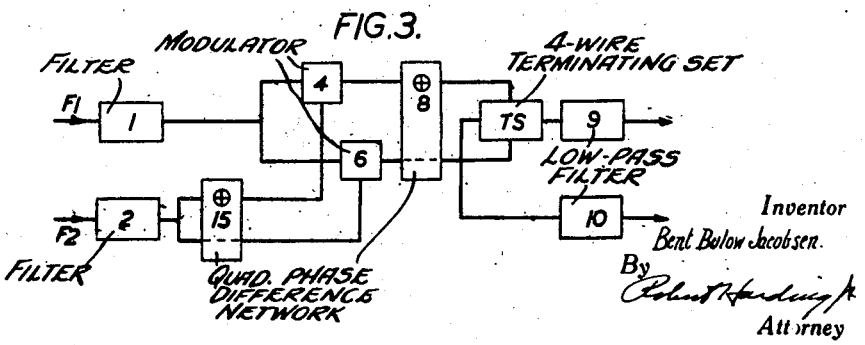
Inventor
Bent Bulow Jacobsen.
By
Robert Harding Jr.
Attorney

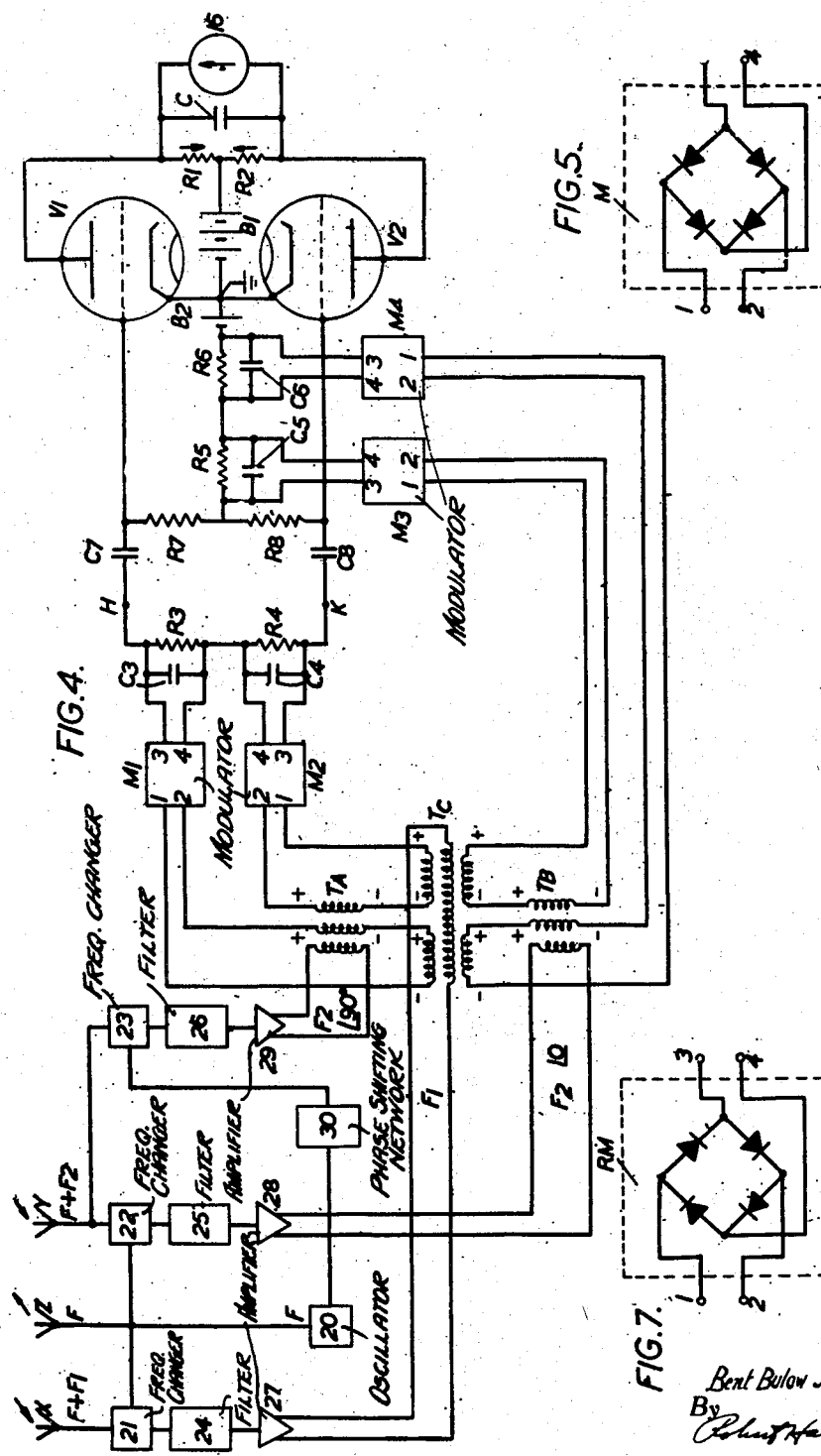

Patented June 28, 1949

2,474,253

UNITED STATES PATENT OFFICE 2,474,253

MEANS FOR MEASURING DIFFERENCE IN FREQUENCY OF ALTERNATING CURRENTS

Bent Bulow Jacobsen, London, England, assignor, by mesne assignments, to International Standard Electric Corporation, New York, N. Y., a corporation of Delaware Application February 24, 1944, Serial No. 523,660 In Great Britain April 1, 1943

23 Claims. (Cl. 172—245)

1

The present invention relates to electrical arrangements for measuring frequency difference, including also means for indicating the sign of the difference.

There are a number of widely differing cases where it is required to indicate or measure the difference between two frequencies for the purpose of deriving information or carrying out some function. In some of these cases also, it is necessary to be able to determine the sign of the difference, that is, it is required to know which of the frequencies is the higher. One application of interest, for example, is to systems for setting the course of aeroplanes, and such a system will be employed to illustrate the invention. It should be understood, however, that the invention is of general interest and is not intended to be limited to any particular application.

The measuring or indicating circuits of this invention employ arrangements in which waves of one of the frequencies are in effect modulated by waves of the other. The processes involved can be equally regarded as "modulation" or "demodulation" according to choice, there being no fundamental difference between the two processes. Accordingly the term "modulation" or "modulator" will be used uniformly throughout this specification to indicate any combination, or means for combining, two frequencies to derive a sum and/or difference frequency therefrom.

The invention employs circuit arrangements which are known in the art as "single-sideband modulators," the features of which are explained later on in the specification. It will suffice at this point to state that single-sideband modulators can be made to have the property of suppressing the upper and/or the lower sideband under certain conditions by a cancellation process which does not involve the use of filters.

According to the invention, there is provided an electrical circuit for measuring in sign and magnitude the difference between the frequencies of two waves, comprising means for applying the waves of both frequencies to each of two single-sideband modulators arranged in such a manner that a lower sideband is produced only in one modulator when the frequency difference has one sign and only in the other when it has the other sign.

According to another aspect, the invention consists in an electrical circuit for deriving an electric current or voltage depending in magnitude and sign on the difference between the frequencies of two waves, comprising means for applying the two waves to each of two circuit branches containing modulating elements and quadrature phase difference networks arranged in such a manner that a sideband having the difference frequency is obtained only in one branch when the difference is positive, and only in the other branch when the difference is negative.

According to another view, the invention may be regarded as an electrical circuit for the determination of the sign and magnitude of the difference between two wave frequencies, comprising two single-sideband modulating branches which are so disposed that when supplied with waves of both the frequencies, substantially only a single lower sideband having the difference frequency is obtained, this single sideband being obtained from one of the branches when the difference is positive, and from the other branch when the difference is negative.

According to a further aspect, the invention may comprise an electrical circuit for the determination of the sign and magnitude of the difference between the frequencies of two waves comprising a single-sideband modulator in which the outputs of the two modulating paths are combined by means of a four-wire terminating set, and arranged so that a lower sideband is obtained from one pair of output terminals of the terminating set when the frequency difference has one sign, and from the other pair of output terminals of the terminating set conjugate to the first mentioned pair when the frequency difference has the other sign.

Considered in terms of an embodiment, the invention may consist in an electrical circuit for producing a rectified current depending on the magnitude and sign of the difference between the frequencies of two waves, comprising two pairs of modulators and two output rectifiers, means for applying the waves of the first frequency in the same phase to one modulator of each pair and in the opposite phase to the other modulator of each pair, means for applying the waves of the second frequency in one phase to both modulators of one pair, and in a phase differing therefrom by ninety degrees to both modulators of the other pair, means for separately combining the outputs of the modulators of each pair, and means for applying the sum of the combined outputs to one output rectifier and the difference to the other, one of the said combined outputs being first changed in phase by ninety degrees.

Finally, in terms of another embodiment, the invention may consist in an electricl circuit for producing a rectified current depending on the magnitude and sign of the difference between the frequencies of two waves, comprising two modulators and two output rectifiers, means for applying the waves of the first frequency to the modulators, means for applying the waves of the second frequency to the modulators respectively in phases differing by ninety degrees, means for applying the sidebands derived from one modulator to each output rectifier, and means for applying the sidebands derived from the other modulator to one output rectifier advanced in phase by ninety degrees, and to the other output rectifier retarded in phase by ninety degrees.

The invention will be described with reference to the accompanying drawings in which—

Figure 1 shows a block schematic diagram which exhibits the basic principles of the invention;

Figures 2 and 3 show modifications of Figure 1;

Figures 4 and 6 show schematic circuit diagrams of two embodiments operating on the same principles as Figure 1; and Figures 5 and 7 show details of modulators used respectively in Figures 4 and 6.

The block schematic circuit diagram Figure 1 shows the principle of the invention. Currents having the frequencies $F_1$ and $F_2$ (either or both of which frequencies may be variable) whose difference $f$ it is desired to determine are applied to two corresponding filters 1 and 2, which are only required if there are likely to be any undesired interfering frequencies which should be removed.

After passing through the filter 1 the frequency $F_1$ is applied to two similar branches of the circuit in parallel. The upper branch comprises two similar modulators 3 and 5 connected in parallel, and leading to a quadrature phase difference network 7. This network comprises two phase changing networks connected respectively in tandem with the modulators 3 and 5 and designed to produce at all material frequencies a phase difference of 90° between the two output currents, which are then combined and applied through a low pass filter 9 and shaping network 11 to an output rectifier or detector 13 having connected to its output a resistance $R_1$, across which it produces a continuous difference of potential.

The lower branch of the circuit comprises similar elements, namely the modulators 4 and 6, the quadrature phase difference network 8, filter 10, shaping network 12 and detector 14 connected to a second resistance $R_2$ equal to resistance $R_1$.

The current of frequency $F_2$ is used as a carrier current for the modulators 3, 4, 5 and 6 and is supplied to them in pairs through a quadrature phase difference network 15 of the same kind as the networks 7 and 8, so that the modulators 5 and 6 are supplied with carrier current having a phase differing by 90° from the phase of the carrier current supplied to the modulators 3 and 4. An indicating instrument 16 is connected to the extreme terminals of the resistances $R_1$ and $R_2$ as shown. The instrument 16 may, for example, be a centre zero direct current voltmeter. The networks 7, 8 and 15 may, for example, be designed in the manner described in the specification of application Serial No. 432,680, now Patent 2,392,476 which issued on January 8, 1946, but any other convenient means for producing a phase difference of 90° over a frequency band of the necessary width may be used. The low pass filters 9 and 10 are used to eliminate unwanted upper sidebands, and the shaping networks 11 and 12 are introduced in order that the voltages applied to the detectors 13 and 14 may be made to vary with the difference frequency $f$ in any desired way; the method of designing these networks is well known. The detectors 13 and 14 may be of any suitable type and the connections to the resistances $R_1$ and $R_2$ should be poled so that the direct currents flow in opposite directions in $R_1$ and $R_2$ as indicated by the arrows in Fig. 1.

It may be pointed out that if the shaping networks 11 and 12 be omitted, the arrangement can still be used to indicate the sign of $f$ if its magnitude is not required to be known.

In Fig. 1 the network 15 is shared between the two branches of the circuit. No material difference to the operation would be obtained if this network were duplicated so as to provide one network individually for each branch. Each branch of Fig. 1 therefore really comprises a single-sideband modulator operating according to the principles explained in United States Patent No. 1,666,206; and also in United States Patent No. 2,248,250, which shows various single-sideband modulation circuit arrangements by means of which certain sidebands may be made substantially to disappear. In this specification any of these arrangements will be called a "single-sideband modulator." According to the present invention, the arrangement is such that one branch of Figure 1 produces the lower sideband $F_1-F_2$ only if $F_1>F_2$, and the other branch produces the lower sideband $F_2-F_1$ only if $F_2>F_1$.

It will be assumed that each of the networks 7, 8 and 15 introduces a phase change of $\varphi$ into the lower path, as indicated in Figure 1, and $\varphi+90°$ into the upper path. The angle $\varphi$ may depend on the frequency, but does not affect the cancelling of the sidebands. For explaining the invention, it will be assumed for simplicity that $\varphi$ is zero, so that each of the networks 7, 8 and 15 can then be regarded as consisting of a single 90° phase changing network arranged in the upper circuit only. The effect of $\varphi$ is merely to change the phase of the combined current output into the filters 9 and 10 and this phase is immaterial since these currents are subsequently separately rectified.

By reference to United States Patent No. 2,248,250 it will be seen that the upper branch of Figure 1 of the accompanying drawings is substantially the same as Figure 2 of that patent when transmission is from right to left. As shown therein, a lower sideband output $F_1-F_2$ will be obtained only if $F_1>F_2$ and nothing at all if $F_1<F_2$. Similarly, the lower branch of the accompanying Figure 1 is substantially the same as Figure 1 of the United States Patent for transmission from right to left. The lower sideband $F_2-F_1$ is obtained only when $F_2>F_1$, but is accompanied by the upper sideband $F_1+F_2$. If $F_1>F_2$, the upper sideband alone is obtained.

Thus with the arrangement of the accompanying Figure 1, the lower sideband $F_1-F_2$ is obtained in the upper branch only when $F_1>F_2$ and the lower side band $F_2-F_1$ is obtained in the lower branch only when $F_2>F_1$. In both cases, however, the upper sideband $F_1+F_2$ is obtained also in the lower branch but not in the upper branch.

The filters 9 and 10 are accordingly provided to eliminate the upper sidebands. Theoretically, filter 9 is not required, but in practice the complete elimination of the upper sideband $F_1+F_2$ in the upper branch is difficult to realise, because it involves designing the network 7 to give a 90° phase difference over a very wide frequency range which includes $F_1+F_2$ as well as $f$. It will thus be seen that a lower sideband input is supplied to the shaping network 11 only when $F_1>F_2$ and to the other shaping network 12 only when $F_1<F_2$. A rectified current is therefore obtained in $R_1$ proportional to the frequency difference $f$ in the first case, and in $R_2$ in the second case, so that the instrument 16 reads on one side of the zero when $f$ is positive and on the other side when $f$ is negative.

It should be explained that at the cost of an extra quadrature phase difference network, theoretical elimination of the upper sideband in both the branches can be obtained. This is shown in Figure 2, which indicates the modification of the left-hand portion of Figure 1 to produce this result, everything to the right of the modulators 5 and 6 being the same as in Figure 1.

The extra network 18 may be similar to the network 15 and is poled the same way so that it introduces a phase change of $90°+\varphi$ in the upper path. The lower branch of the circuit is now similar to Figure 4 of United States Patent No. 2,248,250, for transmission either way. Since, however, as already explained, the suppression of the upper sidebands in the modulators is never completely secured, the filters 9 and 10 (Figure 1) would generally be needed in practice, so that the extra network 18 gives little if any practical advantage.

Referring again to Fig. 1, the two components which are combined at the output side of the network 7 are the same as those combined at the output of the network 8, except that output of network 8 includes in addition a frequency $F_1+F_2$ but they are "added" in one case and "subtracted" in the other; or in other words one of the components is in the same phase at the outputs of networks 7 and 8 while the other is in opposite phases at these points. The recognition of this circumstance enables Fig. 1 to be simplified, as shown in Fig. 3. The modulators 3 and 5, and the quadrature network 7 are not required. The two components at the output of the network 8 are applied respectively to two conjugate pairs of input terminals of a four-wire terminating set TS of well known type. The other two conjugate pairs of output terminals of TS are respectively connected to the input sides of the filters 9 and 10, the remainder of the circuit being as shown in Fig. 1. According to the well known properties of a four-wire terminating set, the two components derived from 8 will be "added" at the input of one of the filters 9, 10, and "subtracted" at the input of the other, so that the effect on the instrument 16 will be the same as in Fig. 1. The arrangement of Fig. 3 thus saves two modulators and a quadrature network at the expense of a four-wire terminating set.

In practical circuits based upon the block schematic diagram of Figure 1, it is often possible to economise apparatus by combining the functions of two or more of the items shown, in one circuit. The result of this is that in the practical embodiment to be described it will not be possible to identify separately all the elements shown in Figure 1.

Figure 4 shows an example of one practical circuit according to the invention, adapted for an aircraft locating system in which an aeroplane pursuing another machine carries a transmitting aerial Z, emitting a carrier wave having a frequency F, and two receiving aerials X and Y placed at some distance apart. The receiving aerials pick up the waves reflected from the pursued machine, which waves will in general have frequencies slightly different from that transmitted and from each other on account of the Doppler effect. These frequencies will be denoted $F+F_1$ and $F+F_2$ respectively, and $F_1$ and $F_2$ will be small compared with F. By measuring the difference $F_1-F_2$ in magnitude and sign it is possible to derive the necessary information to enable the pursuing machine to set the best course.

The circuit of Fig. 4 comprises two parts, the first of which is shown in block schematic form and illustrates one way in which waves having frequencies $F_1$ and $F_2$ may be conveniently derived by known means from the waves received separately by the aerials X and Y. The second part shows an arrangement according to the principles explained with reference to Fig. 1 for measuring $F_1-F_2$.

The block 20 in Fig. 4 represents the oscillator carried by the aeroplane for generating the waves F which are supplied to the transmitting aerial Z. 21, 22 and 23 are three similar frequency changers of any suitable type supplied with waves at frequency F from 20.

Of these, frequency changers 21 and 22 are supplied direct, but frequency changer 23 is supplied through a network 30 which introduces a change of phase of 90°. If the oscillator 20 is connected to frequency changer 23 by a cable which is a quarter of a wave-length longer than that which connects it to frequency changers 21 and 22, the network 30 is not required, its function being carried out by the extra length of cable. The frequency changer 21 is connected to the aerial X, and frequency changers 22 and 23 are connected in parallel to aerial Y. 24, 25 and 26 are filters adapted to remove unwanted frequencies derived from the frequency changers, and 27, 28 and 29 are amplifiers, which are preferably provided with means for maintaining a constant output level.

It will be seen that waves having frequencies $F_2$ but differing in phase by 90° will be obtained at the output of the amplifiers 28 and 29. It will be assumed for simplicity that $F_2$ derived from amplifier 28 has zero phase, so that the other $F_2$ has a phase of 90°. The $F_1$ waves may have any phase.

The outputs of the three amplifiers 27, 28 and 29 are applied respectively to the primary windings of three transformers $T_C$, $T_B$ and $T_A$. Of these transformers $T_A$ and $T_B$ have two equal secondary windings, and transformer $T_C$ has four equal secondary windings.

The poling of these secondary windings is indicated in Figure 4 by + and − signs, which are intended to be interpreted as follows:

When an alternating current is supplied to the primary winding of any transformer, the potentials at the ends of all windings of that transformer marked + will be in the same phase.

The measuring circuit comprises two valves $V_1$ and $V_2$ arranged as rectifiers in opposition, which valves correspond to the output rectifiers 13 and 14 in Figure 1. The resistances $R_1$ and $R_2$, which correspond to the same resistances shown in Figure 1, are connected respectively in series with the anodes, the anode battery $B_1$, (or other suitable high tension source) being connected to the junction point of these resistances. The instrument 16 is connected as shown in Figure 1, and is shunted by a suitable by-pass condenser C, for removing alternating current components from the rectified output of the valves.

Two equal resistances $R_5$ and $R_6$ are connected in series with a portion of the control grid circuit common to both valves and an appropriate biassing battery or other source $B_2$ is also included. The two cathodes may be earthed as indicated.

$R_7$ and $R_8$ are equal resistances shunting the control grids, and the potential drop across two equal resistances, $R_3$ and $R_4$, is applied between the control grids through equal condensers $C_7$ and $C_8$.

The resistances $R_3$, $R_4$, $R_5$ and $R_6$ respectively form the loads of four similar modulators $M_1$, $M_2$, $M_3$ and $M_4$. Figure 5 shows the details of one of these modulators M, which comprises four rectifiers (such as copper oxide or selenium rectifiers) arranged in a bridge of which one pair of diagonal corners are connected to the input terminals 1, 2 and the other pair of diagonal corners are connected to the output terminals 3, 4. These numbers are indicated in Figure 4 in order to define the relative poling of the rectifiers.

It will be seen that modulators $M_1$ and $M_2$ are supplied with frequency $F_2$ in the same phase but with frequency $F_1$ in opposite phases, and similarly for modulators $M_3$ and $M_4$; but that the phase of $F_2$ as supplied to modulators $M_1$ and $M_2$ is 90° in advance of the phase as supplied to modulators $M_3$ and $M_4$. Further, the outputs of both pairs of rectifiers are respectively connected in series opposing.

The L type condenser-resistance networks $C_7$, $R_7$ and $C_8$, $R_8$ perform the combined functions of elements 7 and 11, and 8 and 12 of Fig. 1, respectively. The resistances $R_7$ and $R_8$ should be small compared with the impedances of the condensers $C_7$ and $C_8$ over the frequency range of interest. In that case, the voltage across resistances $R_7$ and $R_8$ will be advanced in phase by substantially 90° over the voltage across resistances $R_3$ and $R_4$ and moreover will be proportional to the frequency.

Hence the voltage applied to the control grids of $V_1$ and $V_2$ will be equal to the voltage drop across resistances $R_5$ and $R_6$ plus or minus, respectively, a voltage proportional to the drop across resistances $R_3$ and $R_4$ advanced in phase by 90°.

The networks $C_7$ $R_7$ and $C_8$ $R_8$ represent only one way of obtaining the desired phase change of 90°. Similar results could be obtained, for instance, by means of a mutual inductance coupling.

The valves $V_1$ and $V_2$ are arranged effectively as a balanced modulator. The input voltages applied to the control grids in parallel, which are derived from the resistances $R_5$ and $R_6$, would alone cause no deflection of the instrument 16, since the currents in resistances $R_1$ and $R_2$ would be equal and opposite. The effect of the push-pull input voltage to the grids, which is derived from the resistances $R_7$ and $R_8$, is to unbalance the voltages applied in parallel to the grids in a direction which depends on the relative phases of the push-pull and parallel input voltages. The push-pull and parallel input voltages are in the same or in opposite phases depending upon whether frequencies $F_1$ or $F_2$ is the larger. The unbalance current registered in the instrument 16 is proportional to $F_1-F_2$ as a result of the use of the networks $C_7$ $R_7$ and $C_8$ $R_8$ so long as the amplifiers 27, 28 and 29 give constant output volume. If the circuit is required only as a null indicator (that is, to show when $F_1=F_2$) the amplifiers need not give constant output, but some automatic output control will generally be desirable.

Valves $V_1$ and $V_2$ are effectively arranged as a balanced demodulator, the input across resistances $R_5$ and $R_6$ (parallel input) causes no deflection of the meter 16 since the currents through resistances $R_1$ and $R_2$ tend to balance; the effect of the input across resistances $R_7$ and $R_8$ (push-pull input) is to unbalance the input to the valves in a direction which depends on the phase of the push-pull input voltage in relation to the parallel input voltage. The push-pull input voltage is of the same or of opposite phase to the parallel input voltage depending on whether friequency $F_1$ or $F_2$ is the larger. The unbalance current registered by the indicator 16 is proportional to $F_1-F_2$. This is obtained by using constant output amplifiers for amplifiers 27, 28 and 29 and by the use of the circuit $C_7$ $C_8$ and $R_7$ $R_8$.

If the circuit is required mainly as a null indicator, the amplifiers 27, 28 and 29 need not be of the constant output type, but some automatic output control will generally be desirable. As explained in connection with Figure 1, unwanted sidebands $F_1+F_2$ will appear. These may be eliminated by appropriate filters as mentioned. In the case of Figure 4, these sidebands are substantially eliminated by means of the condensers $C_3$, $C_4$, $C_5$ and $C_6$ connected to shunt the load resistances $R_3$, $R_4$, $R_5$ and $R_6$. This is quite satisfactory when $F_1+F_2$ is large compared with $f$. In other cases these condensers may be replaced by one or more sections of appropriate wave filters inserted at the same points.

Alternatively, also condensers $C_3$ and $C_4$ may be omitted and a single condenser may be connected between the points H and K or a wave filter may be inserted at this point. Likewise condensers $C_5$ and $C_6$ may be omitted, and resistances $R_5$ and $R_6$ may be together shunted by a single condenser, or they may be connected to the control grid circuit through a wave filter. None of these alternative condensers or filters are shown in Figure 4.

A simplified version of Figure 4 is shown in Figure 6, in which substantially the same results are obtained. Those elements in Figure 6 which are the same as those in Figure 4 have been given the same designations and need not be again described. Two ring modulators $RM_1$ and $RM_2$ are used instead of four bridge rectifiers, and transformers with tapped secondary windings are employed. The left-hand portion of Figure 4 in which the frequencies $F_1$ and $F_2$ are derived from the aerials is not reproduced in Figure 6, but it will be understood that they can be obtained in this or in any other desired way.

The transformers $TT_A$ and $TT_B$ which supply the frequency $F_2$ each have a centre tapped secondary winding, and the transformer $TT_C$ which supplied $F_1$ has two similar centre-tapped secondary windings. The two ring modulators $RM_1$ and $RM_2$ may have the circuit shown in Figure 7. Each of the ring modulators is supplied from one of the windings of transformer $TT_C$, and ring modulator $RM_1$ is also supplied from transformer $TT_A$, and ring modulator $RM_2$ from transformer $TT_B$. The two control grids are supplied in series from the secondary winding taps of transformers TT$_A$ and TT$_C$, and in parallel from the taps of transformers TT$_B$ and TT$_C$.

The condensers C$_9$ and C$_{10}$ are included for the purpose of eliminating the unwanted upper sidebands F$_1$+F$_2$.

It will be understood that Figures 4 and 6 are only two ways in which the principles of the invention as explained with reference to Fig. 1 can be embodied. Although the application to aircraft is of particular interest, the invention may be employed whenever it is required to determine the difference between two frequencies in magnitude and sign for any purpose. Moreover, the instrument 16 could be replaced by a relay or other means for performing some function to be controlled by the frequency difference.

It may be further pointed out that any convenient rectifiers could be used instead of the valves V$_1$ and V$_2$, the circuit being appropriately modified.

What is claimed is:

1. In an electrical measuring circuit, a first A. C. source of one frequency, a second A. C. source of a frequency to be compared with the first frequency, means for modulating the first by the second of said frequencies, comprising two modulating branches, means for applying said two sources to each of said two branches, and means for combining the outputs of the two modulating branches to obtain a lower sideband from one pair of output terminals when the frequency difference has one sign, and from the other pair of output terminals when the frequency difference has the other sign.

2. In an electrical frequency comparison circuit, means for supplying waves of one frequency, means for supplying waves of another frequency to be compared with said first frequency, means for modulating said first waves by said latter waves to produce a difference wave comprising two single-sideband modulators, and means for supplying each of said modulators with waves of both frequencies, the waves of one frequency being supplied to both modulators in phases differing by ninety degrees respectively, the waves of the other frequency being supplied to both modulators in the same phase.

3. In an electrical frequency comparison circuit, means for supplying waves of one frequency, means for supplying waves of another frequency to be compared with said first frequency, means for modulating said first waves by said latter waves to produce difference waves comprising two single-sideband modulators, means for supplying each of said modulators with waves of both frequencies to obtain lower sidebands and means for phase shifting the output of each of said modulators to produce a relative phase difference of ninety degrees.

4. In a circuit according to claim 3, means for combining the outputs having different phases and applying the result to rectifying means.

5. In a circuit according to claim 3, means for combining the outputs having said different phases, applying the result to rectifying means, and network means for shaping said result to make the rectified outputs dependent upon the frequency.

6. In a circuit according to claim 3, means for combining the outputs having said different phases, applying the result to rectifying means, and means for supplying said result to a common utilization device.

7. In an electrical measuring circuit, means for supplying a first frequency wave, means for supplying a second frequency wave, two pairs of modulators and two output rectifiers, means for applying the waves of the first frequency in the same phase to one modulator of each pair and in the opposite phase to the other modulator of each pair, means for applying the waves of the second frequency in one phase to both modulators of one pair and in a phase differing therefrom by ninety degrees to both modulators of the other pair, and means for separately combining the outputs of the modulators of each pair, and means for applying the sum of the combined outputs to one output rectifier and the difference to the other, and means for changing one of the said combined outputs in phase by ninety degrees before combining one with the other of said outputs.

8. In a circuit according to claim 7, means for causing the output current of each rectifier to be substantially proportional to the difference frequency.

9. In a circuit according to claim 7, means for substantially eliminating the upper sidebands from the outputs of the modulators.

10. In a circuit according to claim 7, means for substantially eliminating the upper sidebands from the outputs of the modulators including a condenser shunting the output of each modulator.

11. In a circuit according to claim 3, means for combining the outputs having said different phases and applying the result to rectifying means including a bridge rectifier for each of said modulators.

12. In an electrical comparison circuit, means for supplying a first wave of known frequency, means for supplying a second wave of a frequency to be compared with said known frequency, means for modulating the first by the second wave, two modulators and two output rectifiers, means for applying the first wave to the two modulators, means for applying the second wave to the modulators respectively in phases differing by ninety degrees, means for applying the sidebands derived from one modulator to each output rectifier, and means for applying the sidebands derived from the other modulator to one output rectifier advanced in phase by ninety degrees, and to the other output rectifier retarded in phase by ninety degrees.

13. In a circuit according to claim 12, a common transformer having two center-tapped secondary windings and supplying both modulators with the first wave, and individual transformers each having a center-tapped secondary winding and supplying each modulator with the second wave.

14. In a circuit according to claim 12, a common transformer having two center-tapped secondary windings and supplying both modulators with the first wave, and individual transformers each having a center-tapped secondary winding and supplying each modulator with the second wave, in which the sidebands derived from each modulator are obtained from the center-taps of the corresponding secondary windings.

15. In a crcuit according to claim 12, a common transformer having two center-tapped secondary windings and supplying both modulators with the first wave, and individual transformers each having a center-tapped secondary winding and supplying each modulator with the second wave, and means for substantially eliminating the upper sidebands derived from the two modulators.

16. In a circuit according to claim 12, a common transformer having two center-tapped secondary windings and supplying both modulators with the first wave, and individual transformers each having a center-tapped secondary winding and supplying each modulator with the second wave, and means for substantially eliminating the upper sidebands derived from the two modulators including a condenser connected between the center taps corresponding to each modulator.

17. In a circuit according to claim 12, a four-rectifier bridge circuit.

18. In a circuit according to claim 12, a common transformer having two center-tapped secondary windings and supplying both modulators with the first wave, individual transformers each having a center-tapped secondary winding and supplying each modulator with the second wave, and means for supplying the rectified outputs to two resistances associated with each output and connected in series to a utilization device.

19. In a circuit according to claim 12, a common transformer having two center-tapped secondary windings and supplying both modulators with the first wave, individual transformers each having a center-tapped secondary winding and supplying each modulator with the second wave, and means for supplying the rectified outputs to two resistances associated with each output and connected in series to a utilization device consisting of a direct current indicating instrument.

20. In a circuit according to claim 12, output rectifier means including thermionic valves having biasing means, a common transformer having two center-tapped secondary windings and supplying both modulators with the first wave, and individual transformers each having a center-tapped secondary winding and supplying each modulator with the second wave.

21. An electrical frequency comparing circuit comprising a first source of electrical oscillations, a second source of electrical oscillations at a frequency different from the frequency of said first source, a pair of channels, means to apply the frequencies of said sources to each of said channels, means in one of said channels to produce a direct current output when the frequency of said first source is greater than the frequency of said second source and to produce a greatly reduced output when the freqeuncy of said first source is less than the frequency of said second source, means in said other channel to produce a direct current output when the frequency of said second source is greater than that of said first source and to produce a greatly reduced output when the frequency of said second source is less than that of said first source, and means to indicate which of said channels has the greater output.

22. An electrical frequency comparing circuit in accordance with claim 21 in which means is provided in each channel to control the magnitude of the output thereof in accordance with the difference between the frequencies of said sources.

23. An electrical frequency comparing circuit in accordance with claim 21 in which the means in each channel to produce the direct current output comprises a single side band modulator.

BENT BULOW JACOBSEN.

REFERENCES CITED

The following references are of record in the file of this patent:

UNITED STATES PATENTS

| Number | Name | Date |
|---|---|---|
| 1,931,873 | Marrison | Oct. 24, 1933 |
| 2,176,742 | La Pierre | Oct. 17, 1939 |
| 2,207,540 | Hansel | July 9, 1940 |
| 2,220,098 | Guanella | Nov. 5, 1940 |
| 2,248,250 | Peterson | July 8, 1941 |